(12) United States Patent
Mason

(10) Patent No.: X6830
(45) Date of Patent: Nov. 8, 1831

(54) IRON, BORINGS, DRILLINGS, &C. , IN FURNANCES

(76) Inventor: Maynadier Mason

Maynadier Mason of Georgetown D. C.
Letters Patent

The schedule referred to in these Letters Patent and making part of the same containing a description in the words of the said Maynadier Mason himself of his improvement in the "Process, by which the borings drillings, filings, or turnings of iron are rendered available in the furnace"

To all whom it may concern. Be it known, that I, Maynadier Mason of Georgetown in the County of Washington and District of Columbia have discovered a new and useful process, by which the borings drillings filings, or turnings of cast or other iron may be fused and rendered as available as pig iron in the formation of castings or other useful purposes, and that the following is a full and exact description of my said discovery. I take the borings, drillings, filings, or turnings, and subject them to the action of a powerful press, or to repeated blows from a tilt hammer, drop press, ram, or to the action of any of the well known machines or instruments by which the particles may be forced together and made to adhere, so as to form lumps, partially consolidated. In doing this every competent workman will be aware that the particles to be acted upon must be confined in a box or mould to prevent their being scattered by the pressure or blow to which they are to be subjected. The lumps or masses of iron so formed are placed in a furnace and treated in the same way in which pig or other iron is treated when it is to be fused or rendered available.

What I claim as my invention or discovery, is the bringing the particles of iron which are produced in boring, drilling, filing or turning into lumps or masses by subjecting them to the action of any machine or instrument calculated to effect that object and thus bringing them into a state from which they can be readily fused or rendered available as herein before set forth.

Witnesses
R. Cruikshank
M. Adler

Maynadier Mason [illegible]

377 words ([illegible])